(12) United States Patent
Nakamura et al.

(10) Patent No.: US 6,977,785 B2
(45) Date of Patent: Dec. 20, 2005

(54) MAGNETIC PATTERN TRANSFERRING METHOD FOR PERFORMING A MAGNETIC PATTERN TRANSFER WHILE CORRECTING A MAGNETICALLY DIFFERENT PART

(75) Inventors: Yutaka Nakamura, Kawasaki (JP); Hitoshi Komoriya, Kawasaki (JP); Hiroyuki Suzuki, Kawasaki (JP); Takao Hirahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 399 days.

(21) Appl. No.: 10/107,688

(22) Filed: Mar. 27, 2002

(65) Prior Publication Data

US 2003/0043486 A1 Mar. 6, 2003

(30) Foreign Application Priority Data

Sep. 6, 2001 (JP) .................................... 2001-270998
Nov. 26, 2001 (JP) .................................... 2001-359311

(51) Int. Cl.$^7$ .............................................. G11B 5/86
(52) U.S. Cl. .............................. 360/17; 360/75; 360/31
(58) Field of Search ............................. 360/17, 16, 15, 360/75, 31, 51, 45, 77.08, 78.14

(56) References Cited

U.S. PATENT DOCUMENTS

2002/0159173 A1 * 10/2002 Ishida et al. .................. 360/17

\* cited by examiner

*Primary Examiner*—Alan T. Faber
(74) *Attorney, Agent, or Firm*—Greer, Burns & Crain, Ltd.

(57) ABSTRACT

A magnetic-pattern transferring method is a method for transferring a magnetic pattern to a magnetic recording medium. The method comprises steps as follows. In a master transferring step, a magnetic field is applied to a master placed close to the magnetic recording medium. The magnetic field excites a magnetic layer having a pattern patterned on the master according to the magnetic pattern. Thereby, the pattern of the magnetic layer is transferred to the magnetic recording medium. In a pattern-difference measuring step, a magnetic condition of the magnetic recording medium is measured so as to measure a magnetically different part between the pattern transferred to the magnetic recording medium and the magnetic pattern. In a magnetic transferring step, a pattern transfer is performed to the magnetic recording medium by using the master while applying the magnetic field so as to correct a magnetic condition of the magnetically different part.

14 Claims, 14 Drawing Sheets

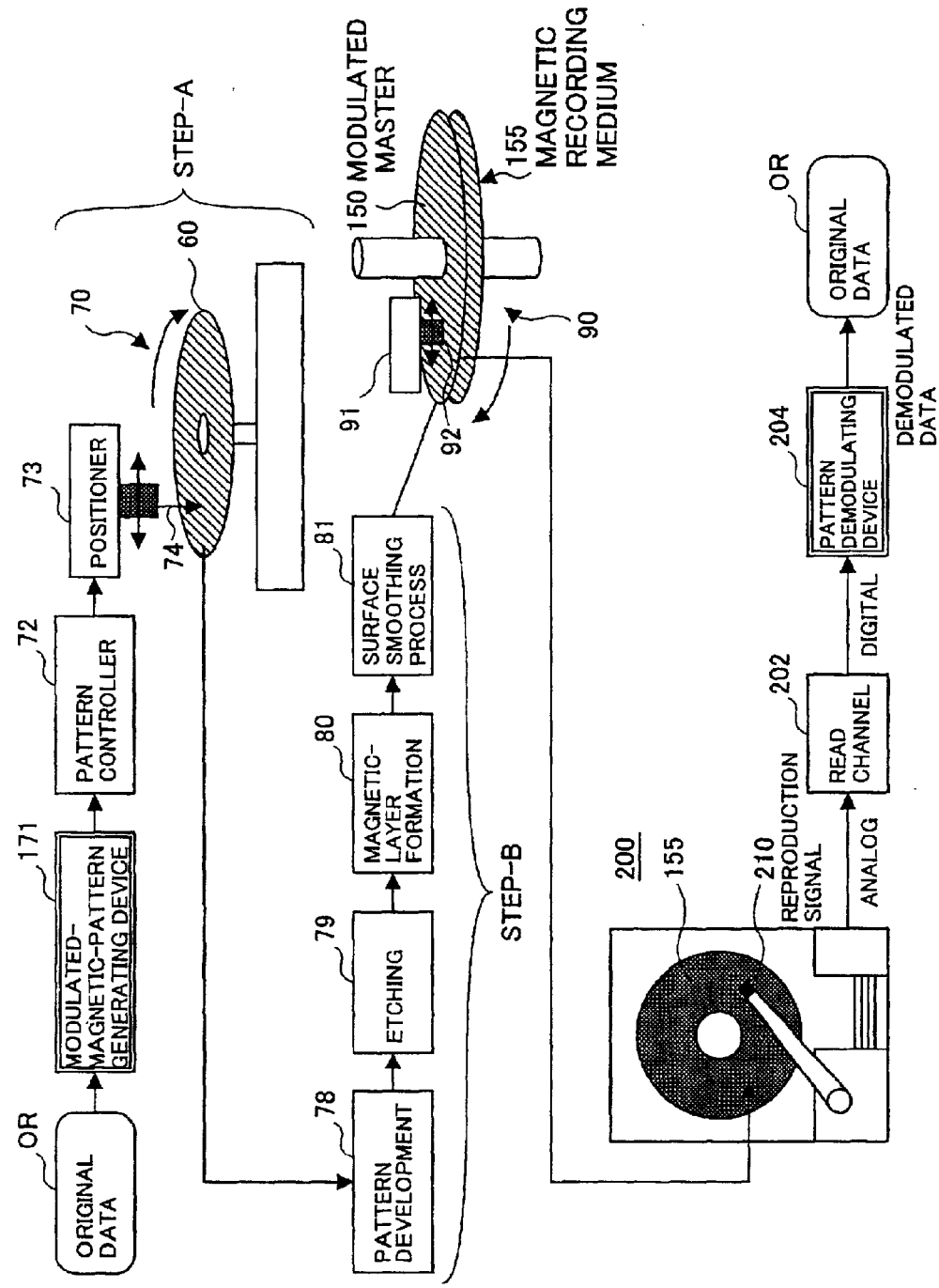

MAGNETIC PATTERN TRANSFERRING METHOD FOR PERFORMING A MAGNETIC PATTERN TRANSFER WHILE CORRECTING A MAGNETICALLY DIFFERENT PART

BACKGROUND OF THE INVENTION

1. Field of the Invention

The present invention generally relates to a magnetic pattern transferring method and a magnetic-pattern transferring device for transferring a predetermined magnetic pattern to a magnetic recording medium, such as a magnetic disk mounted on a magnetic storage device used widely as a device, such as an external storage device for a computer, and a method for manufacturing a master used in a magnetic transfer, etc., and more particularly, to a technology suitable for transferring control-signal information, such as a servo signal, an address signal, and a reproduction clock signal, data, and an OS (Operating System) to a magnetic recording medium product beforehand.

2. Description of the Related Art

In recent years, a magnetic storage device has been provided with a larger capacity and a higher recording density. Accordingly, as information has been increasing in amount, a magnetic recording medium has been desired to have a large capacity enabling a recording of a large amount of information, and to be accessible in a short time, while being available at a low cost. Realizing such a magnetic recording medium entails a use of a tracking servo technology that enables a magnetic head to scan a narrow track with high precision.

In a large-capacity magnetic recording medium, a magnetic pattern including a tracking servo signal is preformatted at a certain interval in one round of a magnetic disk. A magnetic head reads this magnetic pattern and corrects its positioning so as to run on a track with high precision.

Conventionally, such a magnetic recording medium including a predetermined magnetic pattern as mentioned above has been manufactured by recording medium by medium, and track by track, using a servo information recording device used exclusively for a magnetic recording medium. The servo information recording device requires a mechanism for positioning a recording head with high precision, and therefore is expensive. Additionally, as a magnetic recording medium has a larger capacity, recording a magnetic pattern thereon takes a longer time. Accordingly, in a process of manufacturing a large-capacity magnetic recording medium, a step of recording a magnetic pattern occupies a large proportion of the process, raising a manufacturing cost.

Under the heretofore-described circumstances, a technology replacing the above-mentioned track-by-track recording has been proposed. In this technology, a disk including a magnetic layer patterned according to a magnetic pattern is prepared as a master, and the magnetic pattern is transferred to a magnetic recording medium product via the master.

In this transferring method using the master, applying an external magnetic field to the master in contact with a magnetic recording medium to be preformatted excites the above-mentioned magnetic layer to perform a magnetic transfer. Thus, this transferring method using the master can manufacture a magnetic recording medium having a predetermined magnetic pattern in a short time, with simple manufacturing steps, and at a low cost.

As mentioned above, the master includes the magnetic layer (a soft magnetic material) patterned at a position corresponding to a predetermined magnetic pattern concerning servo information, etc. Applying the external magnetic field to this master in contact with the magnetic recording medium excites the soft magnetic material so as to transfer the magnetic-layer pattern patterned on the master to the magnetic recording medium.

Since the above-mentioned master has a fine pattern, the master is manufactured by using a lithographic technology generally used in manufacturing a semiconductor, etc. The master is manufactured by applying a photoresist on a substrate, exposing the substrate with using a photomask corresponding to a magnetic pattern, developing the magnetic pattern, etching the magnetic pattern, sputtering a soft magnetic material on the magnetic pattern, etc.

On one hand, since a semiconductor chip is considerably small, the semiconductor chip is simply discarded once the semiconductor chip has a defective pattern. On the other hand, since a magnetic recording medium has a considerably large area compared to the semiconductor chip, a defective pattern formed at one part makes the whole magnetic recording medium defective; therefore, a patterning of the magnetic recording medium is required to be controlled with higher precision so as to include no defective pattern as a whole. That is, the patterning of the magnetic recording medium requires a more precise measurement control, compared to a patterning of the semiconductor chip.

Furthermore, in order to provide a magnetic recording medium with a still higher recording density, an even finer pattern needs to be formed on the above-mentioned master with high precision. However, the above-mentioned lithographic technology has been facing a limit in forming a highly precise pattern.

FIG. 1 illustrates a conventional magnetic-pattern transferring device 100. In FIG. 1, a master 110 is placed on a magnetic recording medium 120. A predetermined magnetic field 105 is applied from a magnet 101 functioning as a magnetic field generating means. The master 110 has a magnetic layer 111 patterned according to a predetermined magnetic pattern based on a preset servo signal, etc. In a state shown in FIG. 1, the magnetic layer 111 is excited by being subjected to the magnetic field 105 so that a magnetic-layer pattern of the magnetic layer 111 is transferred to the magnetic recording medium 120 as a transferred pattern 121.

However, when the above-mentioned magnetic-layer pattern is finer, it is difficult to control a width and a depth of the magnetic layer 111 by using the contemporary lithographic technology. Therefore, the pattern of the magnetic layer 111 formed on the master 110 "deviates" subtly from the original magnetic pattern. Specifically, the pattern of the magnetic layer 111 formed on the master 110 includes a magnetically different part from the predetermined magnetic pattern. Accordingly, the magnetic recording medium 120 manufactured by a magnetic transfer using this master 110 inevitably has the transferred pattern 121 different from the original magnetic pattern.

Additionally, in the above-mentioned transferring method using the master, when applying the external magnetic field to the master in contact with the magnetic recording medium as a slave, strong and weak magnetic fields originate from the magnetic layer. Based on this phenomenon, a predetermined transferred pattern corresponding to magnetic information can be formed on the magnetic recording medium. More specifically, whereas the magnetic field becomes weaker right under the magnetic layer arranged in the master, a strong magnetic field occurs at an edge of the magnetic layer. These strong and weak magnetic fields enable a transferred pattern corresponding to original magnetic information to be formed on the magnetic recording medium.

However, since there exists a certain transition width in magnetizing the magnetic recording medium as described above, a displacement, i.e., a transfer error may occur between the edge of the magnetic layer of the master and a magnetized part formed on the magnetic recording medium.

FIG. 2 illustrates how the magnetic pattern is transferred to the magnetic recording medium 120 by using the master 110. The magnetic layer 111 is patterned on the under surface of the master 110 at a position corresponding to magnetic information to be transferred. Bringing this master 110 close to the magnetic recording medium 120 and applying the magnetic field 105 externally causes the transferred pattern 121 to be formed on the magnetic recording medium 120 between two parts of the magnetic layer 111, ideally. That is, ideally speaking, as shown in an upper illustration of FIG. 2, each of magnetized parts composing the transferred pattern 121 is formed right between edges of adjacent parts of the magnetic layer 111. Then, when an ideal transfer is performed to the magnetic recording medium 120, a waveform of a signal reproduced from the magnetic recording medium accurately reflects the original magnetic information, as shown in a lower graph of FIG. 2.

However, as mentioned above, a transfer error occurs in an actual transfer to the magnetic recording medium. FIG. 3 illustrates a case where an "extended blur" occurs in the transferred pattern 121 on the magnetic recording medium 120. When the "extended blur" occurs, an extension part 121BR extended from right under the edge of the magnetic layer 111 is formed in the transferred pattern 121 on the magnetic recording medium 120, as shown in an upper illustration of FIG. 3. Thus, when the "extended blur" occurs, a waveform of a signal reproduced from the magnetic recording medium unfavorably becomes displaced from the original magnetic information, as shown in a lower graph of FIG. 3.

Additionally, in another case contrary to the "extended blur" shown in FIG. 3, a "reduced blur", i.e., an reduction part is formed between right under the edge of the magnetic layer 111 and the transferred pattern 121 on the magnetic recording medium 120, though not shown in the figures.

As described above, the transferred pattern being formed at a position displaced from the expected position (right under the edge of the magnetic layer 111) on the magnetic recording medium results in failure to accurately transfer necessary information to a magnetic recording medium product.

SUMMARY OF THE INVENTION

It is a general object of the present invention to provide an improved and useful magnetic pattern transferring method, a magnetic-pattern transferring device, and a technology for restraining a transfer error, in which the above-mentioned problems are eliminated.

A more specific object of the present invention is to provide a magnetic pattern transferring method and a magnetic-pattern transferring device which can accurately transfer an original magnetic pattern to a magnetic recording medium while correcting a magnetically different part included in a master, and to provide a technology for restraining a transfer error from causing a problem on a magnetic recording medium by contriving a magnetic pattern formed on a master.

In order to achieve the above-mentioned objects, there is provided according to one aspect of the present invention a method for transferring a magnetic pattern to a magnetic recording medium capable of recording magnetic information, the method comprising:

a master transferring step of applying a magnetic field to a master placed close to the magnetic recording medium, the magnetic field exciting a magnetic layer having a pattern patterned on the master according to the magnetic pattern, so as to transfer the pattern of the magnetic layer to the magnetic recording medium;

a pattern-difference measuring step of measuring a magnetic condition of the magnetic recording medium after the master transferring step so as to measure a magnetically different part between the pattern transferred to the magnetic recording medium and the magnetic pattern; and a magnetic transferring step of performing a pattern transfer to the magnetic recording medium by using the master while applying the magnetic field so as to correct a magnetic condition of the magnetically different part.

According to the present invention, the pattern transfer is performed to the magnetic recording medium while applying the magnetic field so as to correct the magnetic condition of the magnetically different part of the transferred pattern measured in the pattern-difference measuring step. Therefore, even though the magnetic-layer pattern formed on the master includes the part magnetically different from the original magnetic pattern, the magnetically different part can be corrected so that the original magnetic pattern is transferred to the magnetic recording medium.

Additionally, in the magnetic pattern transferring method according to the present invention, the magnetic transferring step may control the magnetic field by changing a magnitude of an electric current supplied to an electromagnet in synchronization with positional information of the magnetically different part, the electromagnet generating the magnetic field applied for performing the pattern transfer.

Additionally, in the magnetic pattern transferring method according to the present invention, the magnetic transferring step may control the magnetic field by changing a distance between a permanent magnet and the master in synchronization with positional information of the magnetically different part, the permanent magnet generating the magnetic field applied for performing the pattern transfer.

According to the present invention, the magnetic field correcting the magnetic condition of the magnetically different part is supplied while confirming the position of the magnetically different part formed on the magnetic recording medium. Thereby, the original magnetic pattern can be surely formed on the magnetic recording medium.

Additionally, in the magnetic pattern transferring method according to the present invention, the magnetic transferring step may preferably perform the pattern transfer while monitoring the magnetic field applied from the electromagnet or the permanent magnet.

According to the present invention, the magnetic transfer is performed to the magnetic recording medium while confirming the condition of the magnetic field correcting the magnetically different part. Thereby, the original magnetic pattern can be more surely formed on the magnetic recording medium.

In order to achieve the above-mentioned objects, there is also provided according to another aspect of the present invention a magnetic-pattern transferring device transferring a magnetic pattern to a magnetic recording medium capable of recording magnetic information, the device comprising:

a master including a magnetic layer having a pattern patterned according to the magnetic pattern;

a magnet applying a magnetic field exciting the magnetic layer to the master placed close to the magnetic recording medium so as to transfer the pattern of the magnetic layer to the magnetic recording medium; and a controller controlling the magnetic field applied from the magnet so as to correct a magnetic condition of a magnetically different part between the pattern transferred to the magnetic recording medium and the magnetic pattern.

According to the present invention, the controller controls the magnetic field applied from the magnet so as to correct the magnetically different part of the transferred pattern upon performing the pattern transfer to the magnetic recording medium. Therefore, even though the magnetic-layer pattern formed on the master includes the part magnetically different from the original magnetic pattern, the magnetically different part can be corrected so that the magnetic-pattern transferring device can transfer the original magnetic pattern accurately to the magnetic recording medium.

Besides, the above-mentioned magnet can be used both for applying a constant magnetic field so as to simply transfer the magnetic-layer pattern formed on the master to the magnetic recording medium, and for applying a magnetic field so controlled as to correct the magnetically different part.

Additionally, the magnetic pattern transferring device according to the present invention may preferably further comprise a memory preliminarily storing difference data indicating the magnetically different part so that the controller controls the magnetic field applied from the magnet according to the difference data.

According to the present invention, the controller controls the magnetic field applied from the magnet surely according to the difference data indicating the magnetically different part. Therefore, the magnetic-pattern transferring device can transfer the original magnetic pattern accurately to the magnetic recording medium.

Additionally, the magnetic pattern transferring device according to the present invention may further comprise a magnetic reproducing head measuring a magnetic condition of the magnetic recording medium so as to detect a magnetically different part detection signal indicating the magnetically different part, wherein the difference data is created according to the magnetically different part detection signal.

According to the present invention, the magnetic reproducing head provided for measuring the magnetic condition of the magnetic recording medium can indirectly measure a "deviation" of the magnetic-layer pattern formed on the master. By using this measurement result as the difference data stored in the memory, the magnetic-pattern transferring device can perform a series of steps for performing a pattern transfer to the magnetic recording medium while applying the magnetic field correcting the magnetically different part.

Additionally, in the magnetic pattern transferring device according to the present invention, the magnet may be an electromagnet generating the magnetic field applied to the master, the magnetic field being controlled by changing a magnitude of an electric current supplied to the electromagnet, or may be a permanent magnet generating the magnetic field applied to the master, the magnetic field being controlled by changing a distance between the permanent magnet and the master.

According to the present invention, when the electromagnet or the permanent magnet is used as the magnet applying the magnetic field, the intensity of the magnetic field applied to the master can be properly adjusted.

Additionally, the magnetic pattern transferring device according to the present invention may further comprise a magnetic sensor detecting the magnetic field applied from the magnet so as to supply a magnetic-field detection signal indicating a condition of the magnetic field to the controller, wherein the controller controls the magnetic field applied from the magnet by using the magnetic-field detection signal.

According to the present invention, the magnetic-pattern transferring device performs the magnetic transfer to the magnetic recording medium while the magnetic sensor confirms the condition of the magnetic field correcting the magnetically different part. Thereby, the magnetic-pattern transferring device can form the original magnetic pattern on the magnetic recording medium more surely.

Additionally, the magnetic pattern transferring device according to the present invention may preferably further comprise a difference position detecting unit detecting a position of the magnetically different part on the magnetic recording medium so as to supply a position detection signal indicating the position of the magnetically different part to the controller, wherein the controller controls the magnetic field applied from the magnet positioned opposite the magnetically different part according to the position detection signal.

According to the present invention, the magnet can supply the magnetic field correcting the magnetically different part while the controller confirms the position of the magnetically different part. Thereby, the magnetic-pattern transferring device can more surely form the original magnetic pattern on the magnetic recording medium.

In order to achieve the above-mentioned objects, there is also provided according to another aspect of the present invention a method for manufacturing a master used for a magnetic transfer, the method comprising:

a first-master manufacturing step of manufacturing a first master including a predetermined magnetic pattern based on magnetic information;

a magnetic-pattern transferring step of transferring the magnetic pattern to a magnetic recording medium by using the first master;

an error confirming step of confirming an amount of a transfer error between the magnetic pattern transferred to the magnetic recording medium and the predetermined magnetic pattern; and a second-master manufacturing step of manufacturing a second master as an authentic master based on a correction magnetic pattern so formed as to offset the amount of the transfer error.

Additionally, the master manufacturing method according to the present invention may further comprise a step of forming the correction magnetic pattern by shifting an edge position of a magnetic layer to be formed on the authentic master from an edge position of a magnetic layer formed on the first master according to the amount of the transfer error so as to offset the amount of the transfer error.

According to the present invention, the transfer error is corrected in the authentic master. This authentic master can be used to transfer magnetic information to the magnetic recording medium with accuracy.

In order to achieve the above-mentioned objects, there is also provided according to another aspect of the present invention a magnetic recording medium including magnetic signal marks formed across tracks adjacent to one another, the magnetic signal marks representing magnetic information, wherein the magnetic signal marks adjacent to each other share an overlapping area.

According to the present invention, the adjacent magnetic signal marks are formed so as to overlap each other. This shortens an outer periphery of the magnetic signal marks as a whole. Accordingly, the edge positions inflicted with transfer errors also become shorter as a whole so as to restrain influences of the transfer errors.

In order to achieve the above-mentioned objects, there is also provided according to another aspect of the present invention a method for manufacturing a magnetic recording medium, the method comprising the steps of:

preparing a modulated master including a modulated magnetic pattern so modulated from a predetermined magnetic pattern corresponding to magnetic information as to reduce a number of edges; and transferring the modulated magnetic pattern to the magnetic recording medium by using the modulated master so as to form a transferred pattern on the magnetic recording medium.

According to the present invention, the transferred pattern formed on the magnetic recording medium also has a small number of edges, reducing influences of transfer errors.

In order to achieve the above-mentioned objects, there is also provided according to another aspect of the present invention a magnetic information reproducing device loaded with a magnetic recording medium including magnetic information transferred thereto by using a modulated master including a modulated magnetic pattern so modulated from a predetermined magnetic pattern corresponding to the magnetic information as to reduce a number of edges; the device comprising:

a pattern demodulating device demodulating the modulated magnetic pattern so as to reproduce the magnetic information transferred to the magnetic recording medium.

According to the present invention, the magnetic-information reproducing device can reduce influences of transfer errors by reproducing the magnetic information from the magnetic recording medium including the transferred pattern having a small number of edges.

Other objects, features and advantages of the present invention will become more apparent from the following detailed description when read in conjunction with the accompanying drawings.

BRIEF DESCRIPTION OF THE DRAWINGS

FIG. 15 illustrates a series of steps from forming the modulated master, through manufacturing the magnetic recording medium, to loading and reproducing the magnetic recording medium on a magnetic information reproducing device.

DETAILED DESCRIPTION OF THE PREFERRED EMBODIMENTS

Figure 4:
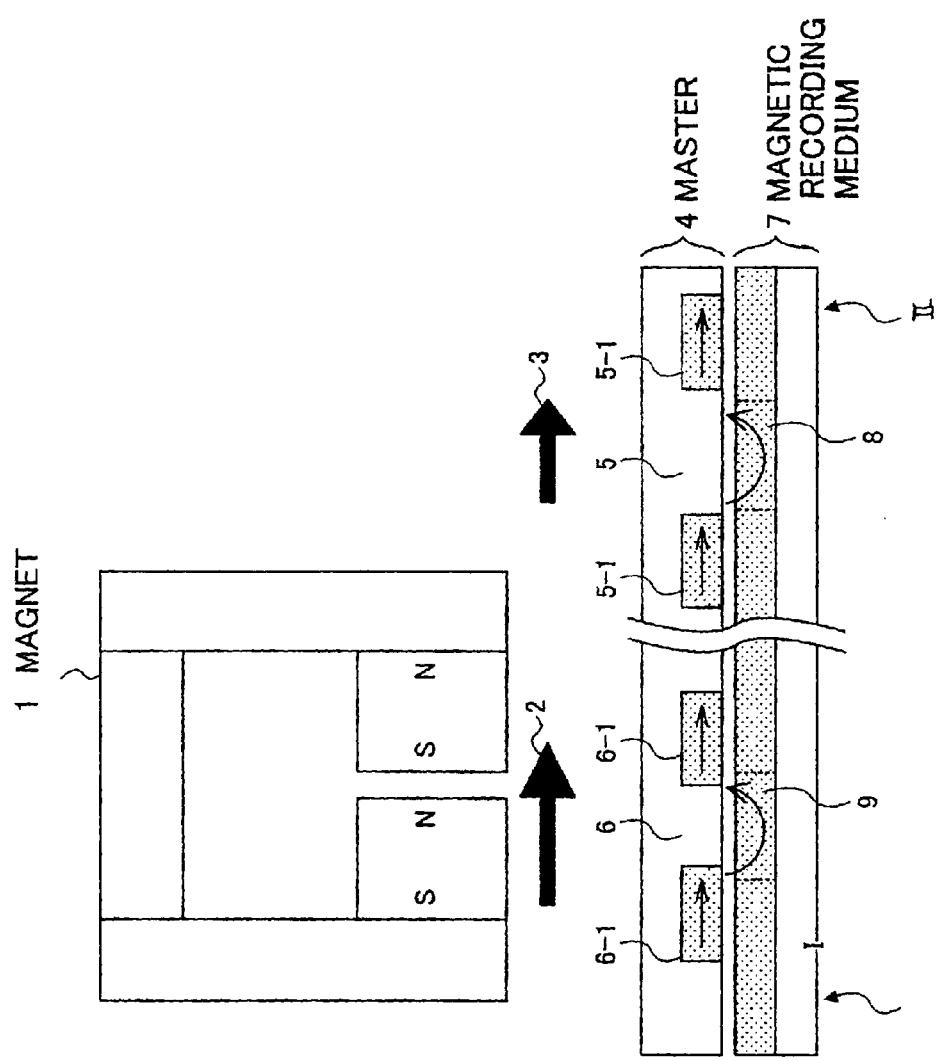
FIG. 4 is an illustration used for explaining a basic principle according to one aspect of the present invention.

A description will now be given, with reference to the drawings, of embodiments according to the present invention. FIG. 4 is an illustration used for explaining a basic principle according to one aspect of the present invention.

Figure 1:
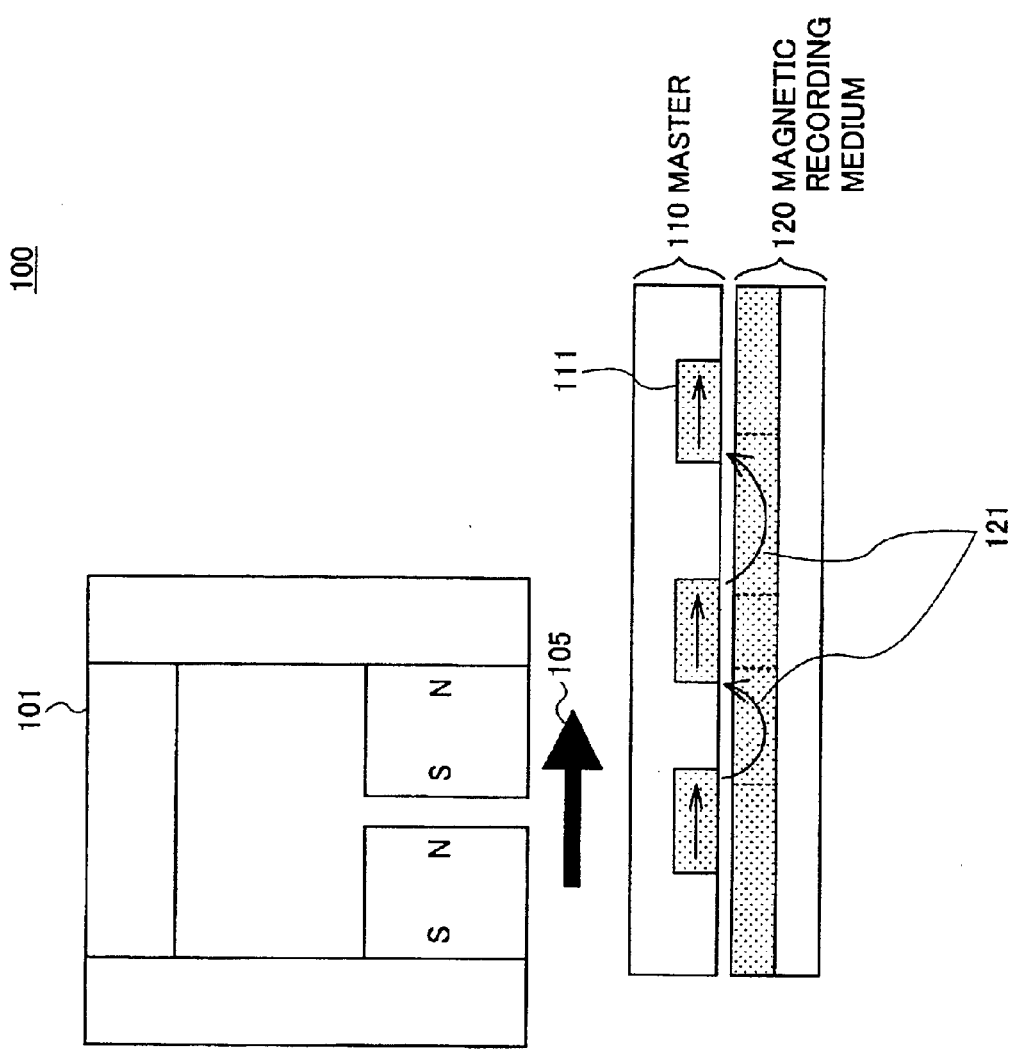
FIG. 1 is an illustration of an example of a conventional magnetic-pattern transferring device.
Figure 2:
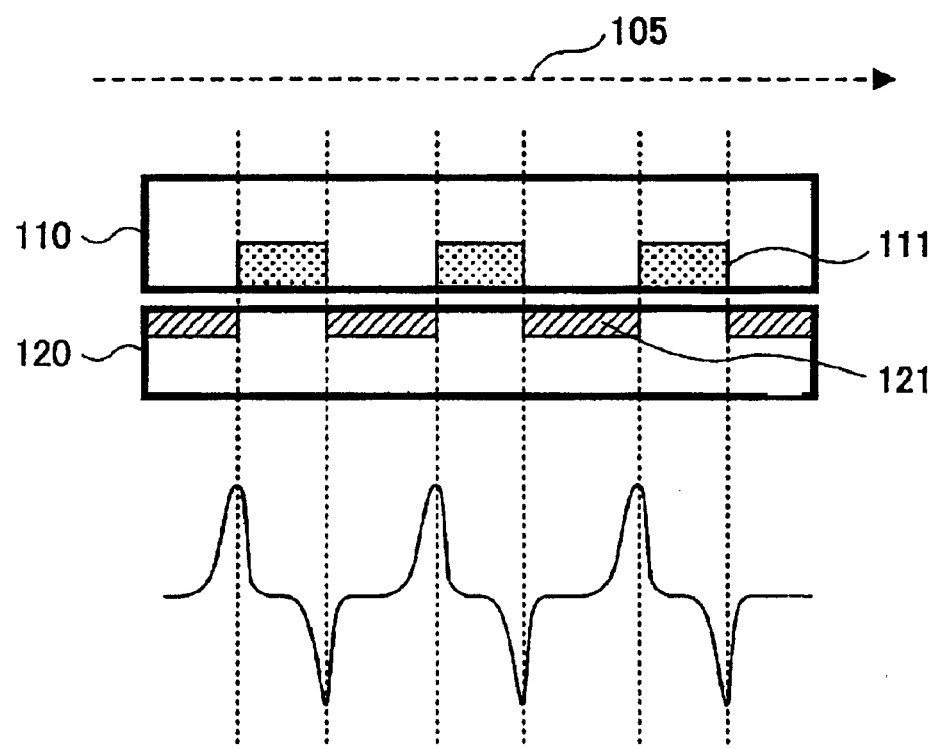
FIG. 2 illustrates a transfer of a magnetic pattern to a magnetic recording medium by using a master.
Figure 3:
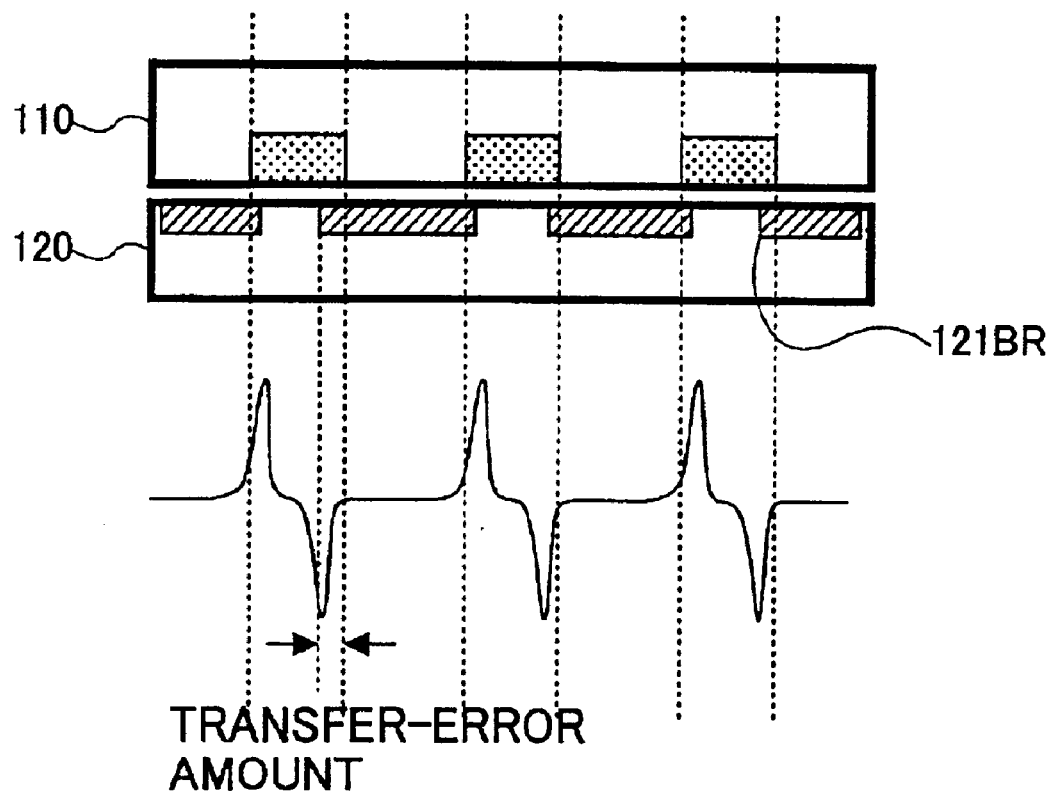
FIG. 3 illustrates a case where an "extended blur" occurs in a transferred pattern on the magnetic recording medium.

In FIG. 4, a master 4 is placed on a magnetic recording medium 7, and a magnetic field is applied from a magnet 1 functioning as a magnetic field generating means, as described with reference to FIG. 1. However, in the present invention, in case a pattern transferred to the magnetic recording medium 7 "deviates" as described hereinbefore, an intensity of the magnetic field applied to the master 4 is properly controlled so as to neutralize the deviation.

Specifically, when a pattern (a magnetic-layer pattern) is formed on the master 4 by using the above-mentioned lithographic technology, the magnetic-layer pattern occasionally differentiates subtly from an original magnetic pattern. Thereupon, in the present invention, the magnetic-layer pattern formed on the master 4 is measured beforehand so as to confirm a part (a magnetically different part) different from the original magnetic pattern. Then, a magnetic transfer is performed to the magnetic recording medium 7 while the magnetic field is applied so as to correct a magnetic condition of this magnetically different part to an original condition. Therefor, the magnetic field applied from the magnet 1 to the master 4 is so arranged as to correct the above-mentioned magnetically different part. This arrangement is described in detail hereinafter.

Here, a description will be given, with reference to FIG. 4, of an instance where the magnetic field is controlled so as to neutralize the magnetically different part according to the present invention. FIG. 4 shows two parts I and II of the master 4 and the magnetic recording medium 7, the two parts I and II being distant from each other. In the left part I, the original magnetic pattern is formed on the master 4 such that soft magnetic layers 6-1 are formed at an appropriate interval 6. However, in the right part II, a problem in patterning the master 4 causes soft magnetic layers 5-1 to be formed at an interval 5 wider than the original magnetic pattern.

Conventionally, when the wider interval 5 is formed as in the right part II of the master 4 shown in FIG. 4, a constant magnetic field is applied from the magnet 1 such that a relatively wide magnetic pattern is transferred to the magnetic recording medium 7. As a result of this, the magnetic pattern transferred to the magnetic recording medium 7 "deviates" as a whole, as mentioned above.

However, in the present invention, as indicated by arrows representing magnetic fields 2 and 3, the intensity of the applied magnetic field is controlled according to patterning conditions of the magnetic layers formed on the master 4. Specifically, in a magnetic transfer performed in the part II of the master 4 having an inaccurate patterning dimension, the small magnetic field 3 is applied, compared to the magnetic field 2 used in a magnetic transfer performed in the part I, so that a magnetic pattern 8 formed on the magnetic recording medium 7 in the part II correctively becomes a magnetic pattern similar to a magnetic pattern 9 formed in the part I.

Accordingly, even though the magnetic-layer pattern formed on the master 4 includes a part magnetically different from the original magnetic pattern as designed, a transferred pattern corresponding to the original magnetic pattern can be formed on the magnetic recording medium 7 while the magnetically different part is corrected.

Besides, as also described hereinafter in the following embodiments, first performed in the present invention is a master transferring step of transferring the magnetic-layer pattern included in the master 4 to the magnetic recording medium 7 by applying a constant magnetic field to the master 4. By this master transferring step, the magnetically different part included in the magnetic-layer pattern formed on the master 4 is reflected, as it is, on a transferred pattern formed on the magnetic recording medium 7. In a pattern-difference measuring step coming next, a magnetic condition of the magnetic recording medium 7 having the transferred pattern including the magnetically different part is measured so as to find a difference from the original magnetic pattern. Based on a measurement result of this pattern-difference measuring step, difference data is created.

The difference data is stored in a storing means, such as a memory. Subsequently, in a magnetic transferring step, a pattern transfer is performed to the magnetic recording medium 7 while the magnetic field applied from the magnet 1 is controlled based on this difference data.

That is, after the magnetically different part is measured in the master transferring step and the pattern-difference measuring step, only the magnetic transferring step is repeated for performing the pattern transfer while applying the magnetic field so as to correct the magnetically different part. Only these steps can manufacture the magnetic recording medium having the original magnetic pattern. In this course, it is preferred that the magnetic field be applied so as to correct the magnetically different part while confirming the magnetically different part by referring to positional information supplied from a sensor detecting the magnetically different part. The following embodiment sets forth an example of an arrangement for obtaining the above-mentioned positional information.

Hereinbelow, descriptions will be given of embodiments according to the one aspect of the present invention.

[First Embodiment]

In a first embodiment of the present invention, an electromagnet is used as the magnetic field generating means, and the intensity of the magnetic field applied to the master is controlled by changing an electric current supplied to this electromagnet, so as to form the original magnetic pattern on the magnetic recording medium.

Figure 5:
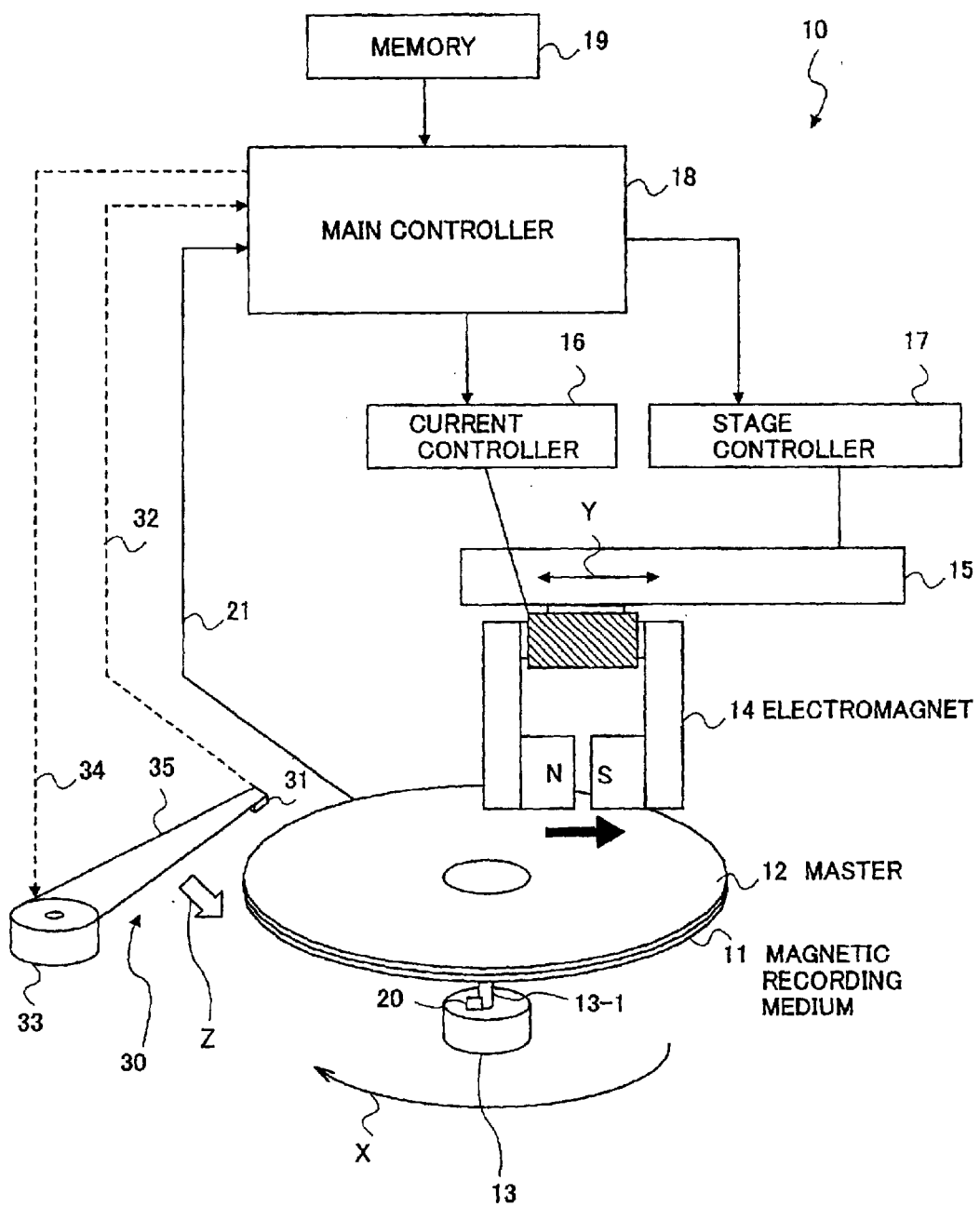
FIG. 5 illustrates a structure of a magnetic-pattern transferring device according to a first embodiment of the present invention.

FIG. 5 illustrates a structure of a magnetic-pattern transferring device 10 according to the first embodiment.

As shown in FIG. 5, a master 12 is placed on a magnetic recording medium 11. The magnetic recording medium 11 and the master 12 have forms of a disc, and are unitarily rotated in a direction indicated by a curvy arrow X in close contact with each other by a spindle 13-1 of a motor 13.

In the present embodiment, a photo interrupter 20 (a difference position detecting unit), for example, is provided in the vicinity of the spindle 13-1 so as to detect a status of a rotation of the spindle 13-1. A detection signal of the photo interrupter 20 is supplied to a main controller 18 as a rotational position detection signal 21. The main controller 18 is described in detail hereinafter. It is noted that the magnetic recording medium 11 and the master 12 are fixed at predetermined positions with respect to the spindle 13-1 so that a rotational position of the magnetic recording medium 11 and the master 12 can be located by referring to the rotational position detection signal 21.

An electromagnet 14 is provided as a magnetic field generating means opposite to the upper surface of the master 12. This electromagnet 14 is arranged underneath a stage 15 to be movable in a radial direction of the master 12. The stage 15 is connected to a stage controller 17. This stage controller 17 controls a driving source (not shown in the figure) of the stage 15 so as to set the electromagnet 14 at a desired position in a direction indicated by a double-headed arrow Y.

The electromagnet 14 is connected to a current controller 16. The current controller 16 controls a magnitude of an electric current supplied to the electromagnet 14 so as to vary the intensity of a magnetic field generated from the electromagnet 14, i.e., a magnetic field applied to the master 12.

Further, the magnetic-pattern transferring device 10 comprises the main controller 18, as mentioned above. The main controller 18 detects the rotational position of the master 12 according to the above-mentioned rotational position detection signal 21 so as to recognize a position, in a circumferential direction, of a magnetically different part included in a magnetic pattern formed on the master 12. Upon applying a constant magnetic field from the electromagnet 14, the magnetic pattern formed on the master 12 is transferred to the magnetic recording medium 11 as a transferred pattern including the magnetically different part. Additionally, the main controller 18 comprises a memory 19. The memory 19 stores difference data obtained by comparing the transferred pattern including the magnetically different part with the original magnetic pattern.

By using the rotational position detection signal 21, the main controller 18 supplies drive signals to the stage controller 17 and the current controller 16 so as to control the position of the electromagnet 14 and the magnetic field generated therefrom. More specifically, the main controller 18 refers to the rotational position detection signal 21 so as to specify the position of the magnetically different part in the circumferential direction, and causes the stage controller 17 to move the electromagnet 14 properly in the radial direction so as to position the electromagnet 14 opposite the magnetically different part. The main controller 18 also causes the current controller 16 to correct the magnetic field applied from the electromagnet 14 so as to neutralize an error of the magnetically different part. In the present embodiment, the main controller 18, the stage controller 17 and the current controller 16 function as magnetic field controlling means.

According to the magnetic-pattern transferring device 10 configured as describe above, even though the magnetic pattern formed on the master 12 includes the magnetically different part, the magnetically different part can be corrected so as to eliminate the deviation of the pattern transferred on the magnetic recording medium 11 and form the original magnetic pattern thereon.

Besides, although the present first embodiment detects and uses the status of the rotation of the spindle 13-1 so as to detect the rotational position of the magnetic recording medium 11 and the master 12, this configuration may be replaced by other configurations that can recognize the rotational position. For instance, a predetermined mark may be printed on an outer periphery of the master so that the mark is detected by a sensor, such as a CCD.

In addition, the difference data stored beforehand in the memory 19 may be created as follows. First, the constant magnetic field is applied from the electromagnet 14 so as to transfer a pattern reflecting the magnetically different part included in the master 12 to the magnetic recording medium 11. Then, this magnetic recording medium 11 is retrieved from the magnetic-pattern transferring device 10, and a magnetization of the magnetic recording medium 11 is reproduced and measured by an evaluation device, such as a magnetic reproducing device. The difference data can be created from this measurement result and be stored in the memory 19.

[Variation 1]

In the above-described first embodiment, the magnetic pattern formed on the master 12 is measured beforehand, and is stored in the memory 19 as correction data (difference data), such that the main controller 18 causes the magnetic field to be applied according to the correction data so as to correct the magnetically different part.

Here, a description will be given, also with reference to FIG. 5, of a variation 1 of the above-described first embodiment, further comprising a magnetic reproducing head reading the magnetic pattern.

FIG. 5 includes a magnetic reproducing head mechanism 30. The magnetic reproducing head mechanism 30 has a configuration in which a magnetoresistive element 31 used for a magnetic reproduction is mounted on a front end of an arm 35 revolved by an actuator unit 33. Driven by the actuator unit 33, the magnetoresistive element 31 is moved above the upper surface of the master 12 in a radial direction indicated by a white arrow Z. It may be arranged that the main controller 18 perform a drive control of the actuator unit 33 by supplying a drive control signal 34.

In the present variation 1, the magnetic-pattern transferring device 10 has a function of confirming a magnetically different part included in a magnetic-layer pattern formed on the master 12. The constant magnetic field is applied from the electromagnet 14 to the master 12 so as to transfer the pattern to the magnetic recording medium 11. The pattern transferred to the magnetic recording medium 11 is detected (reproduced) by the magnetoresistive element 31.

A magnetically different part detection signal 32 is supplied from the magnetoresistive element 31 to the main controller 18 so that the magnetically different part included in the magnetic-layer pattern formed on the master 12 is indirectly measured. Thereafter, the magnetic pattern formed on the master 12 is compared with the original magnetic pattern so as to store a difference therebetween in the memory 19, as in the first embodiment. Then, the magnetic pattern transfer to the magnetic recording medium is repeated while correcting the pattern, as described above.

According to the present variation 1, since a step of detecting the magnetically different part included in the magnetic-layer pattern formed on the master 12 (the above-mentioned master transferring step and the above-mentioned pattern-difference measuring step) can also be performed, the magnetic-pattern transferring device 10 can perform a series of the steps.

[Second Embodiment]

A magnetic-pattern transferring device according to a second embodiment of the present invention has a function of monitoring the magnetic field applied from the magnetic field generating means to the master so as to transfer the magnetic pattern to the magnetic recording medium with higher precision.

Figure 6:
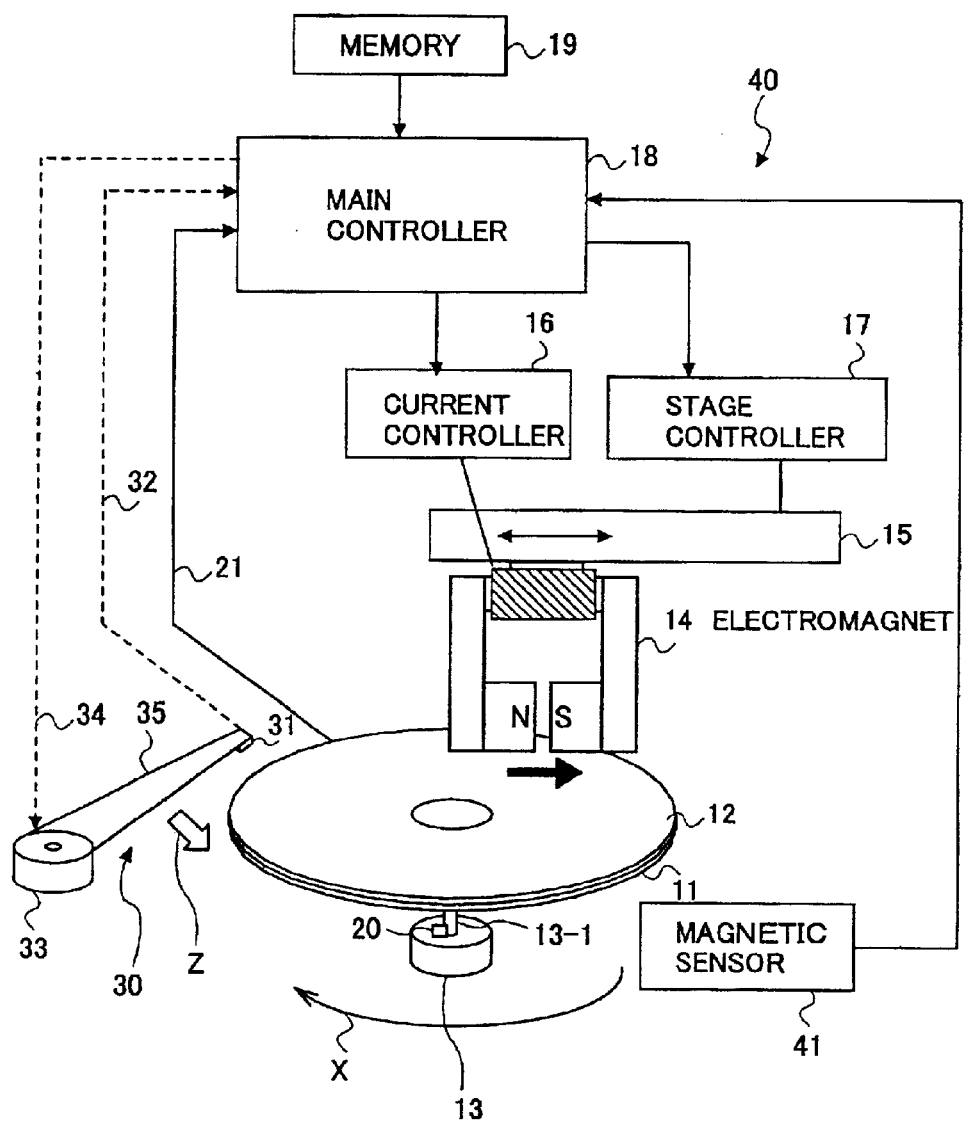
FIG. 6 illustrates a structure of a magnetic-pattern transferring device according to a second embodiment of the present invention.

FIG. 6 illustrates a structure of a magnetic-pattern transferring device 40 according to the second embodiment. Elements in FIG. 6 that are identical or equivalent to the elements of the magnetic-pattern transferring device 10 shown in FIG. 5 are referenced by the same reference marks, and will not be described in detail. The magnetic-pattern transferring device 40 comprises a magnetic sensor 41 as a means for monitoring the magnetic field applied from the magnetic field generating means so as to detect the applied magnetic field and feed back detected information (a magnetic-field detection signal) to the main controller 18. Thus, the magnetic-pattern transferring device 40 according to the present second embodiment can control transferring conditions with higher precision.

As a variation 2 in the present second embodiment, the magnetic-pattern transferring device 40 may comprise the magnetic reproducing head mechanism 30, as in the variation 1 in the first embodiment, so as to detect the magnetic-layer pattern formed on the master 12.

[Third Embodiment]

In a third embodiment of the present invention, a permanent magnet is used as the magnetic field generating means, and the intensity of the magnetic field applied to the master is controlled by changing a distance between this permanent magnet and the master, so as to form the original magnetic pattern on the magnetic recording medium.

Figure 7:
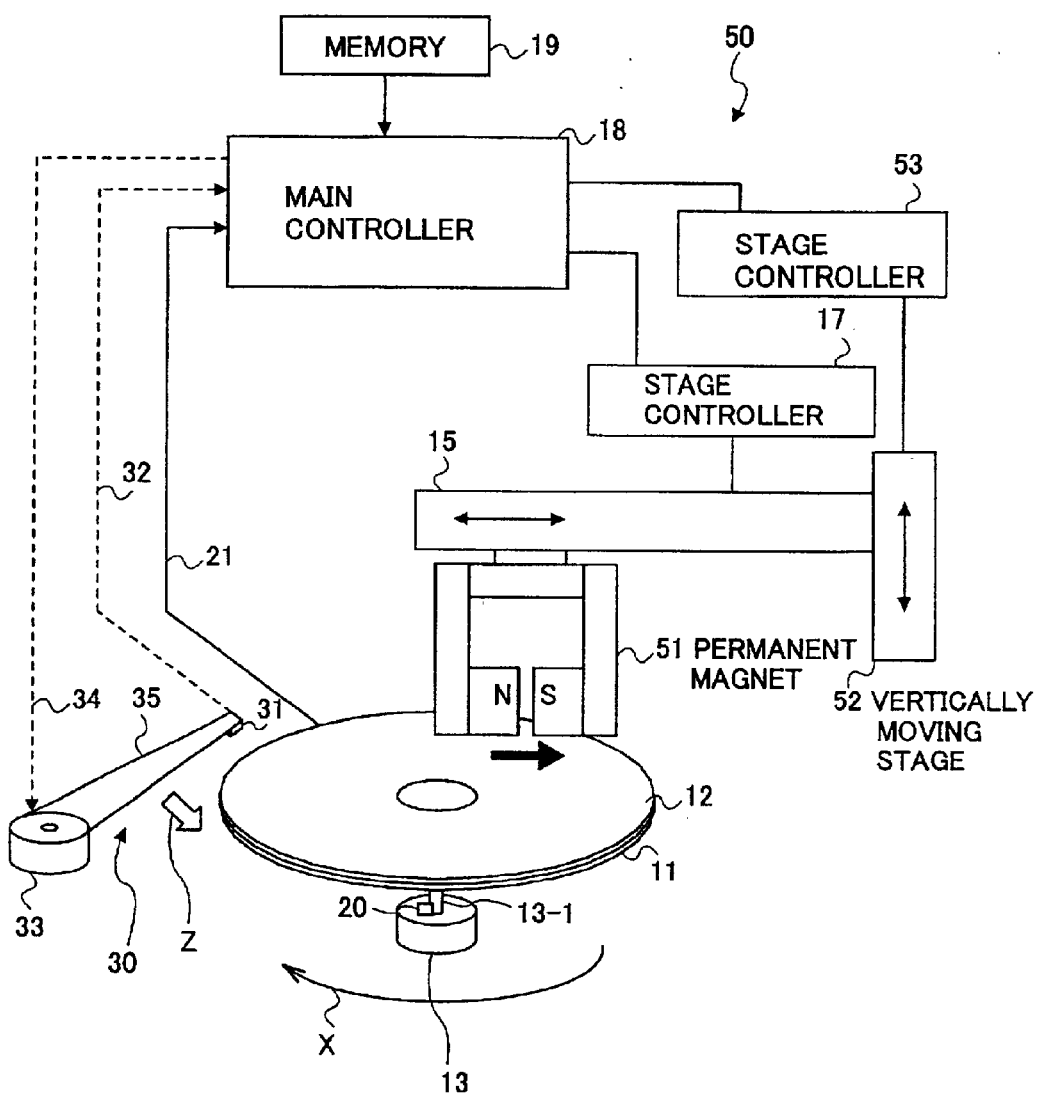
FIG. 7 illustrates a structure of a magnetic-pattern transferring device according to a third embodiment of the present invention.

FIG. 7 illustrates a structure of a magnetic-pattern transferring device 50 according to the third embodiment.

Elements in FIG. 7 that are identical or equivalent to the elements of the magnetic-pattern transferring device 10 shown in FIG. 5 are referenced by the same reference marks, and will not be described in detail.

The magnetic-pattern transferring device 50 according to the present third embodiment comprises a vertically moving stage 52 and a stage controller 53 controlling a movement of the vertically moving stage 52 so as to change a distance from a permanent magnet 51 to the upper surface of the master 12. The stage controller 53 is controlled by the main controller 18, as in the first embodiment. In the present embodiment, the main controller 18, the stage controller 17 and the stage controller 53 function as magnetic field controlling means.

In the present third embodiment, too, the magnetically different part included in the master 12 is measured beforehand, and is stored in the memory 19 as correction data, such that the main controller 18 causes the magnetic field to be applied according to the correction data so as to correct the magnetically different part. In this course, the distance from the permanent magnet 51 to the upper surface of the master 12 is changed by moving the vertically moving stage 52 so as to change the intensity of the magnetic field applied to the master 12, characteristically in the present third embodiment.

According to the magnetic-pattern transferring device 50 configured as describe above, even though the magnetic pattern formed on the master 12 includes the magnetically different part, the magnetically different part can be corrected so as to transfer the original magnetic pattern to the magnetic recording medium 11.

Additionally, the magnetic-pattern transferring device 50 according to the present third embodiment may further comprise the magnetic sensor 41 described in the second embodiment so as to monitor the magnetic field applied from the permanent magnet 51. Thereby, the main controller 18 controls a feedback so as to transfer the original magnetic pattern to the magnetic recording medium 11 with high precision.

Further, as a variation 3 in the present third embodiment, the magnetic-pattern transferring device 50 may comprise the magnetic reproducing head mechanism 30, as in the variation 1 in the first embodiment, so as to detect the magnetic-layer pattern formed on the master 12.

As described above, the magnetic-pattern transferring device controls the intensity of the magnetic field applied upon transferring the magnetic pattern formed on the master to the magnetic recording medium. Therefore, even though the magnetic-layer pattern formed on the master includes the magnetically different part, the magnetic-pattern transferring device can transfer the original magnetic pattern to the magnetic recording medium while correcting the magnetically different part.

Whereas the heretofore described one aspect of the present invention solves the problem caused in the course of manufacturing the master (i.e., the magnetically different part included in the magnetic-layer pattern), the hereinbelow described other aspect of the present invention solves a problem concerning a transfer error occurring upon transferring the magnetic pattern formed on the master to the magnetic recording medium. The other aspect of the present invention includes three preferred embodiments (fourth to sixth embodiments). Hereinbelow, descriptions will be given of these three embodiments in order.

[Fourth Embodiment]

First, the fourth embodiment includes an error confirming step of preliminarily confirming a transfer-error amount due to the above-described "extended blur" and the "reduced blur". A correction magnetic pattern is so formed as to correct the transfer-error amount confirmed in the error confirming step. Based on this correction magnetic pattern, an authentic master is manufactured. A highly precise magnetic pattern transfer can be realized by bringing the manufactured master close to a magnetic recording medium and applying an external magnetic field so as to transfer the magnetic pattern formed on the master to the magnetic recording medium.

Besides, once the transfer-error amount is confirmed in the error confirming step, the authentic master can be manufactured similarly. Additionally, as the error confirming step, a preliminary experiment, etc. may be performed aside from a series of the manufacturing steps so as to obtain the above-mentioned transfer-error amount. Alternatively, the above-mentioned transfer-error amount may be obtained by being estimated in a simulation, etc. The fourth embodiment incorporates the error confirming step prior to manufacturing the authentic master.

Figure 8:
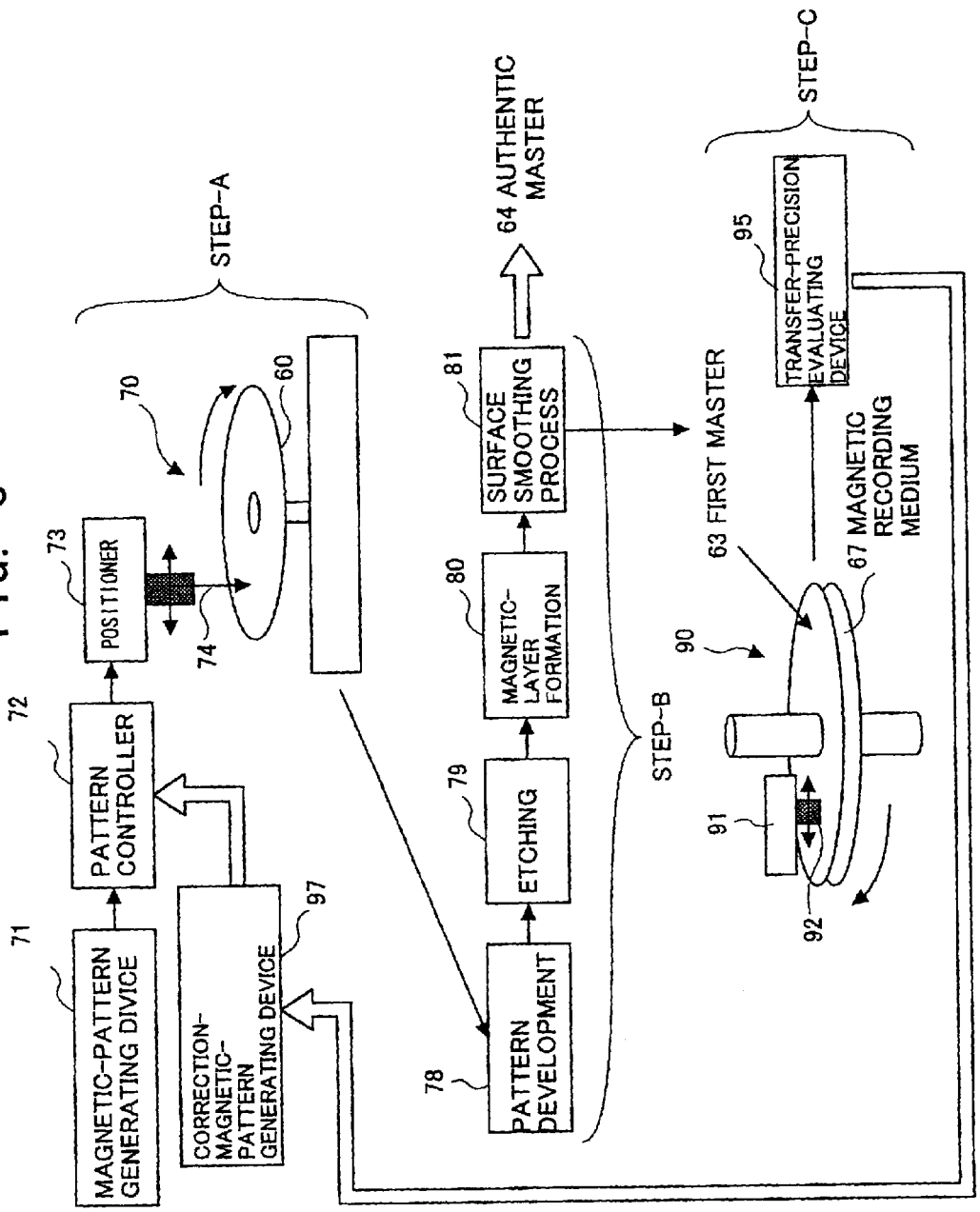
FIG. 8 is an illustration outlining steps for manufacturing an authentic master according to a fourth embodiment of the present invention.

Here, a description will be given of the fourth embodiment according to the present invention. FIG. 8 is an illustration outlining steps for manufacturing the authentic master including the error confirming step according to the fourth embodiment.

Firstly, a first master 63 having a predetermined magnetic pattern based on magnetic information to be transferred to a magnetic recording medium is manufactured as follows. The first master 63 is manufactured in the same manner as conventionally. In step-A shown in FIG. 8, a step of generating and exposing a magnetic pattern is performed as a first stage of manufacturing the first master 63. Specifically, a photosensitive material is applied on a substrate 60 provided for the first master, and an exposing device 70 performs an exposing process to the photosensitive material according to a predetermined magnetic pattern to be transferred. The predetermined magnetic pattern is generated by a magnetic-pattern generating device 71. In the exposing device 70, while a pattern controller 72 positions a positioner 73, the positioner 73 projects a laser or an electronic beam so as to expose the photosensitive material applied on the substrate 60.

Subsequently, in step-B, a step of developing and smoothing the magnetic pattern is performed as a second stage of manufacturing the first master 63. In this step-B, a pattern development 78, an etching 79, a magnetic-layer formation 80, and a surface smoothing process 81 are performed so as to finish manufacturing the first master 63. In the above-mentioned step-A and step-B, the master is manufactured by using the lithographic technology, as conventionally.

A characteristic part of the present fourth embodiment starts with step-C including the error confirming step for confirming a transfer-error amount. In this step-C, the first master 63 is set in a magnetic transferring device 90, while a positioner 91 positions the first master 63, so as to perform a magnetic transfer to a magnetic recording medium 67. Then, a transferred pattern formed on the magnetic recording medium 67 is evaluated by a transfer-precision evaluating device 95. This transfer-precision evaluating device 95 compares the predetermined magnetic pattern (a targeted pattern) generated by the magnetic-pattern generating device 71 based on the magnetic information with the transferred pattern (a resulting pattern) actually formed on the magnetic recording medium 67 so as to confirm the transfer-error amount. Information concerning this transfer-error amount is supplied to a correction-magnetic-pattern generating device 97.

Figure 9:
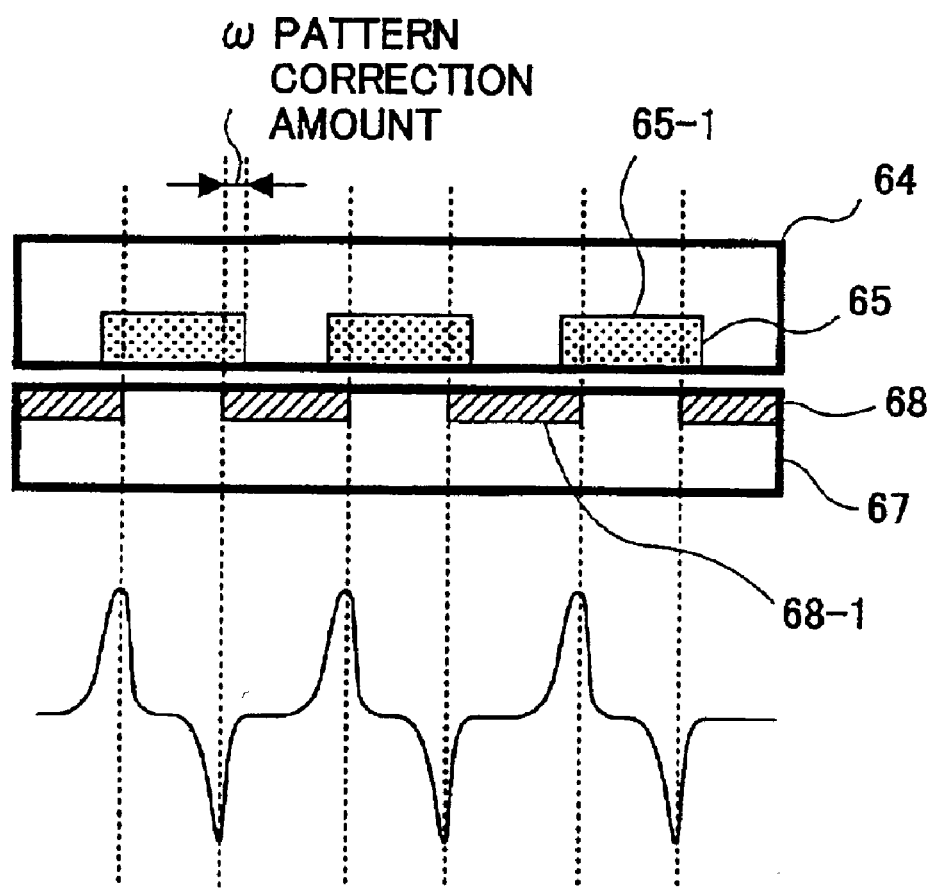
FIG. 9 illustrates the authentic master including a correction magnetic pattern.

This correction-magnetic-pattern generating device 97 generates a correction magnetic pattern 65 (shown in FIG. 9) including a magnetic-layer pattern so patterned as to offset the above-mentioned transfer-error amount. FIG. 9 illustrates an authentic master 64 including the correction magnetic pattern 65. As shown in FIG. 9, the authentic master 64 includes the correction magnetic pattern 65 having a magnetic layer 65-1 shifted by a pattern correction amount ω at edge positions thereof so as to offset the transfer-error amount. According to the above-described arrangement, even though a transfer error occurs upon transferring the magnetic pattern formed on the master to the magnetic recording medium, a transferred pattern 68 corresponding to the predetermined magnetic pattern can be formed on the magnetic recording medium 67.

Besides, FIG. 9 illustrates an example of the correction magnetic pattern correcting the "extended blur" occurring in the transferred pattern. In a case of the "extended blur" where a magnetized part 68-1 composing the transferred pattern 68 formed on the magnetic recording medium 67 is extended at edge positions thereof, the correction magnetic pattern 65 is so generated that the edge positions of the magnetic layer 65-1 are shifted outwardly by the pattern correction amount ω so as to offset this "extended blur". In a case of the "reduced blur", the correction magnetic pattern 65 is generated in a converse manner to the above-mentioned case of the "extended blur", such that the edge positions of the magnetic layer 65-1 are shifted inwardly by the pattern correction amount ω so as to offset the "reduced blur".

As shown in FIG. 8, after the correction magnetic pattern 65 is generated by the correction-magnetic-pattern generating device 97 as described above, the authentic master 64 is manufactured as a second master through the step-A and the step-B, as in manufacturing the first master 63. Since the authentic master 64 includes the correction magnetic pattern 65 so formed as to offset the transfer-error amount, the transfer error occurring upon transferring the magnetic pattern to the magnetic recording medium 67 can be restrained so as to realize an accurate pattern transfer to the magnetic recording medium 67. Accordingly, a waveform of a signal reproduced from the magnetic recording medium 67 accurately reflects the original magnetic pattern, as shown in a lower graph of FIG. 9.

[Fifth Embodiment]

Figure 10A:
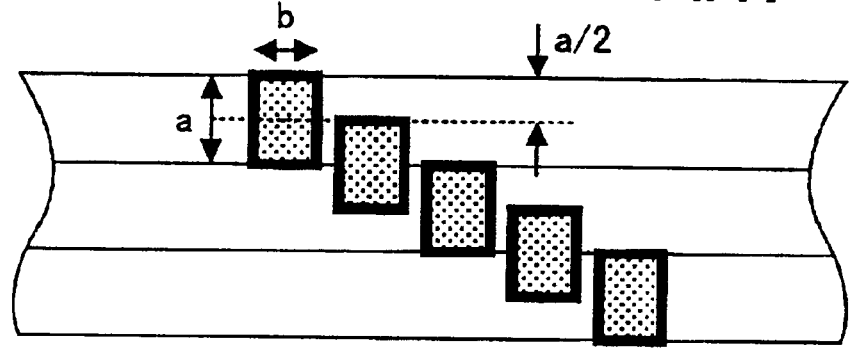
FIG. 10A and FIG. 10B are magnified views of a part of tracks formed on a surface of a conventional magnetic recording medium.
Figure 10B:
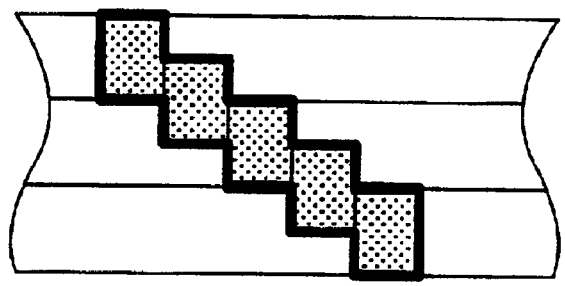
Figure 10C:
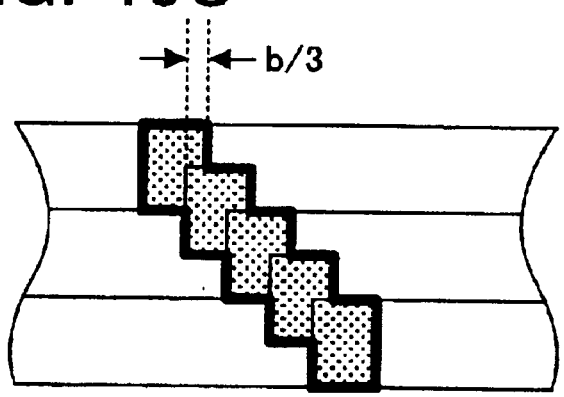
FIG. 10C is a magnified view of a part of tracks formed on a surface of a magnetic recording medium according to a fifth embodiment of the present invention.

The fifth embodiment focuses on that the transfer error such as the "extended blur" occurs at the edge positions of the magnetic layer. A magnetic recording medium according to the present fifth embodiment is so structured as to restrain influences of the transfer error. Hereinbelow, a description will be given of the fifth embodiment. FIG. 10A to FIG. 10C are magnified views of a part of tracks formed on a surface of the magnetic recording medium.

Servo information (magnetic information) used for causing a magnetic head to follow a track is required to be written as a signal crossing over a plurality of tracks, for a purpose of calculating an amount of a positional error from a particular track based on a magnitude of a reproduction signal reproduced from bits (hereinbelow referred to as magnetic signal marks) of the signal crossing over the tracks. Alternatively, the servo information is required to be written as cycles of a signal composed of magnetic signal marks adjacent to each other in a linear form crossing the tracks obliquely, for a purpose of calculating an amount of a positional error based on a phase difference of the cyclic signal. Each of the above-mentioned magnetic signal marks corresponds to the magnetized part composing the pattern transferred from the master to the magnetic recording medium. Accordingly, the transfer error occurs at a perimeter of each of the magnetic signal marks.

Thereupon, in the present fifth embodiment, in a case of transferring the positional servo information crossing over the tracks, the adjacent magnetic signal marks are agglomerated under predetermined conditions so as to create an overlapping area. This agglomeration shortens a peripheral length of edges of the transferred pattern formed on the magnetic recording medium. This shortened peripheral length enables restraining influences of the transfer error.

Hereinbelow, a more detailed description will be given, with reference to FIG. 10A to FIG. 10C, of the fifth embodiment.

As shown in FIG. 10A, a servo information signal is transferred on a conventional magnetic recording medium as a transferred pattern including magnetic signal marks not overlapping each other but shifted by ½ of a width of each of the magnetic signal marks. Peripheral lengths of edges of the transferred pattern including the not overlapping magnetic signal marks total (10a+10b).

Additionally, as shown in FIG. 10B, another conventional magnetic recording medium has a pattern including adjacent magnetic signal marks contacting each other. In this case, edges of the magnetic signal marks have a shorter peripheral length totaling (6a+10b) so as to preferably reduce an incidence of transfer errors.

However, it is still preferable that a transferred pattern formed on a magnetic recording medium include as few transfer errors as possible.

Thereupon, the magnetic recording medium according to the present fifth embodiment has a pattern including positively overlapped magnetic signal marks. Specifically, as shown in FIG. 10C, the magnetic signal marks are overlapped by ⅓ of a length of each of the magnetic signal marks in a circumferential direction as indicated by arrows shown in FIG. 10C so that edges of the magnetic signal marks have a still shorter peripheral length totaling (6a+3b/16). This still shorter peripheral length enables restraining influences of the transfer error more surely.

A master forming the transferred pattern as illustrated in FIG. 10C can be used to form the magnetic recording medium including the pattern having the still shorter total peripheral length according to the present embodiment. The present embodiment can restrain influences of the transfer error with simple arrangements.

[Sixth Embodiment]

In the sixth embodiment of the present invention, a master including a modulated pattern restraining the transfer error such as the "extended blur" is manufactured; a magnetic recording medium is manufactured by using this master; and the magnetic recording medium is reproduced while being demodulated by a magnetic information reproducing device. Hereinbelow, a description will be given of the sixth embodiment.

Figure 11:
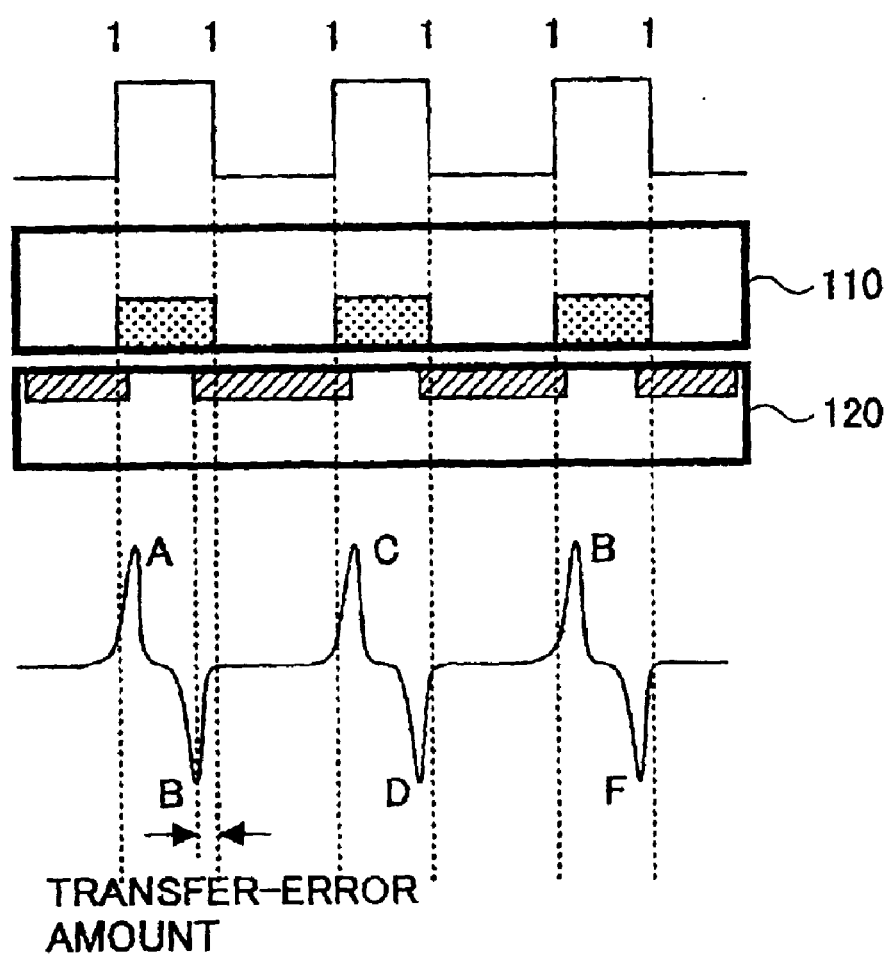
FIG. 11 illustrates a conventional example of a magnetic transfer of 6-bit data.

FIG. 11 illustrates a conventional example of a magnetic transfer of 6-bit data (1, 1, 1, 1, 1, 1). When this 6-bit data is transferred to a magnetic recording medium 120 without any contrivances, transfer errors occur at six positions A to F corresponding to edge positions of magnetic layers formed in a master 110, as described above. As can be understood from FIG. 11, as the number of edges increases, the incidence of transfer errors also increases.

Figure 12A:
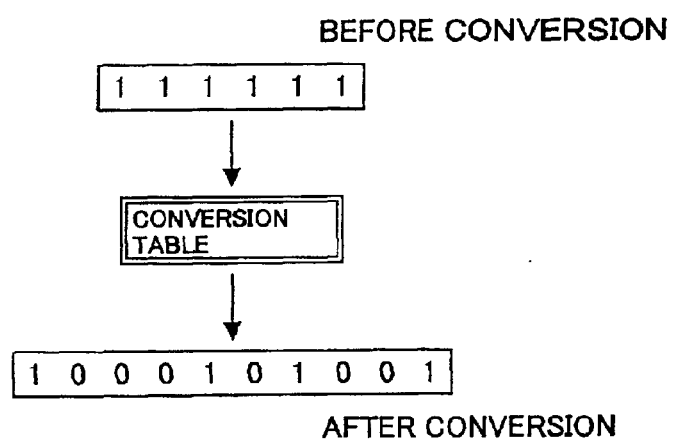
FIG. 12A illustrates a conversion table according to a sixth embodiment of the present invention.

Thereupon, the present sixth embodiment uses a modulated master including a modulated magnetic pattern so modulated as to reduce the number of edges. Specifically, a conversion table as illustrated in FIG. 12A is provided in a hereinafter-described modulated-magnetic-pattern generating device. For example, this conversion table converts the above-mentioned 6-bit data (1, 1, 1, 1, 1, 1) into 10-bit data (1, 0, 0, 0, 1, 0, 1, 0, 0, 1).

Figure 12B:
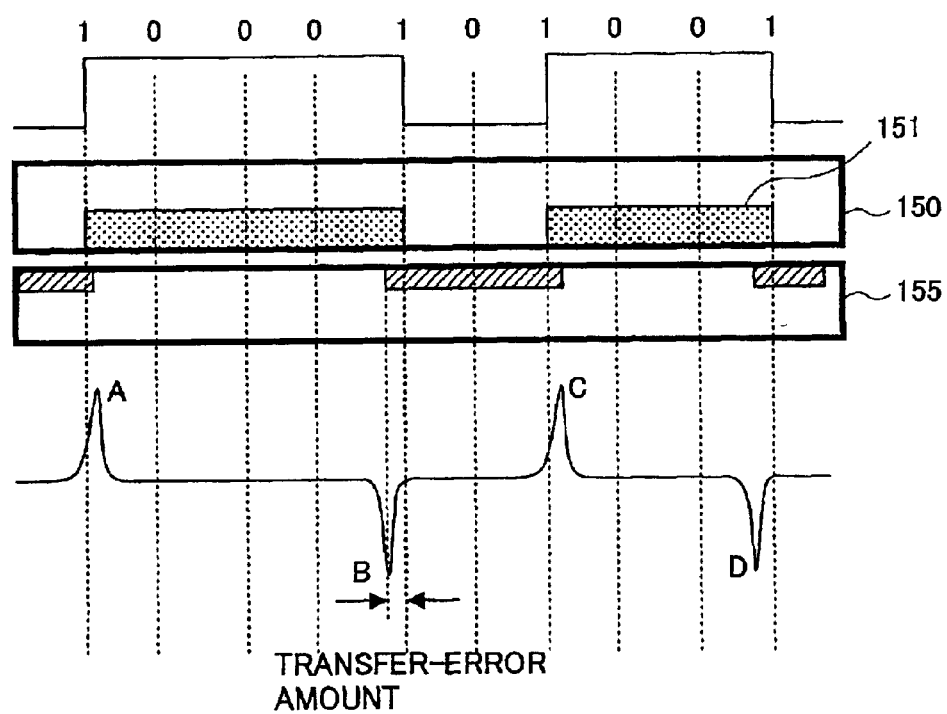
FIG. 12B illustrates a modulated master formed based on data converted by the conversion table.

Based on this converted data (10-bit data), a modulated master 150 is formed as shown in FIG. 12B. This modulated master 150 includes a modulated magnetic pattern 151 composed of 4 bits and 3 bits with 2 bits therebetween. Transferring with this modulated master 150 reduces the number of transfer errors which occur at only four positions A to D. Accordingly, the modulated magnetic pattern 151 shown in FIG. 12B can largely restrain transfer errors occurring on a magnetic recording medium 155, compared to the non-modulated magnetic-layer pattern shown in FIG. 11.

As described above, the present sixth embodiment converts original data into a signal reducing the number of edges, and transfers a pattern including the reduced number of edges restraining the occurrence of transfer errors so as to increase a transferring precision.

Figure 13:
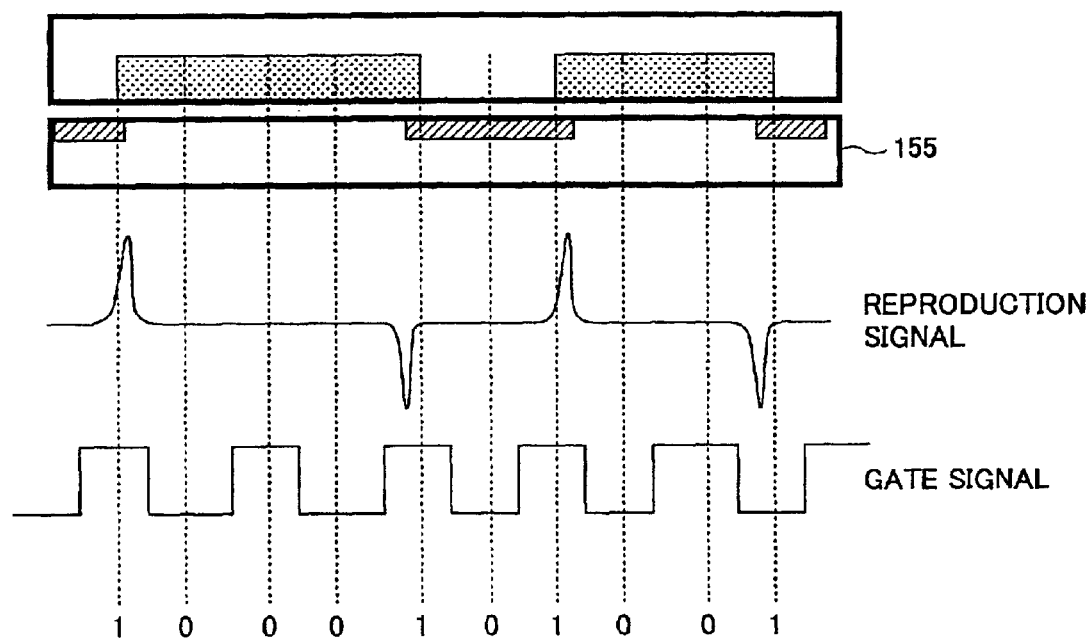
FIG. 13 illustrates a reproduction signal reproduced from a magnetic recording medium and data reproduced by using a gate signal.

FIG. 13 illustrates a reproduction signal reproduced from the magnetic recording medium 155 and the 10-bit data reproduced by using a gate signal. Besides, a reproducing process indicated in FIG. 13 is performed by the magnetic information reproducing device loaded with the magnetic recording medium 155.

Figure 14:
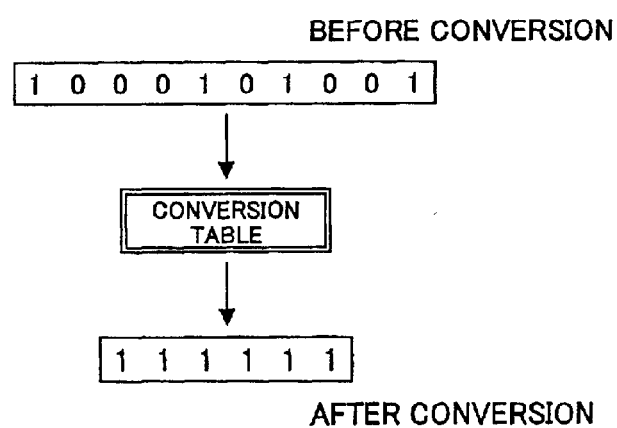
FIG. 14 illustrates a conversion table used for reversely looking up reproduced data.

The magnetic information reproducing device comprises a pattern demodulating device including a conversion table used for reversely looking up the reproduced data as shown in FIG. 14. The reproduced data is demodulated by the pattern demodulating device so as to be converted into the original data. Specifically, when transferred data having the composition of 4 bits and 3 bits with 2 bits therebetween is read by a magnetic head, and the 10-bit data (1, 0, 0, 0, 1, 0, 1, 0, 0, 1) is obtained by the gate signal, the original data, i.e., the 6-bit data (1, 1, 1, 1, 1, 1) can be obtained by performing a reverse lookup in the conversion table provided in the pattern demodulating device.

FIG. 15 illustrates a series of steps from forming the modulated master including the modulated magnetic pattern, through manufacturing the magnetic recording medium, to loading and reproducing this magnetic recording medium on the magnetic information reproducing device. The steps according to the present sixth embodiment shown in FIG. 15 include approximate parts to the manufacturing steps according to the above described fourth embodiment shown in FIG. 8. Elements in FIG. 15 that are identical or equivalent to the elements shown in FIG. 8 are referenced by the same reference marks, and will not be described in detail. Instead, the following description will be given mainly of characteristic points of the present sixth embodiment.

In step-A shown in FIG. 15, a step of generating and exposing the modulated magnetic pattern 151 is performed as a first stage of manufacturing the modulated master 150. The step-A shown in FIG. 15 is distinctive from the step-A shown in FIG. 8 by including a process of modulating original data OR into the modulated magnetic pattern 151 having a small number of edges by a modulated-magnetic-pattern generating device 171. Aside from this point, the step-A is performed in the same manner as in the fourth embodiment. Specifically, the photosensitive material is applied on the substrate 60 provided for the modulated master, and the exposing device 70 performs an exposing process for the modulated magnetic pattern 151. Subsequently, in step-B, a step of developing and smoothing the modulated magnetic pattern is performed as a second stage of manufacturing the modulated master 150. This step-B is the same as in the above-described fourth embodiment.

The modulated master 150 manufactured in the step-A and the step-B is set in the magnetic transferring device 90 so as to perform a magnetic transfer to the magnetic recording medium 155. Thereby, a transferred pattern corresponding to the modulated magnetic pattern 151 of the modulated master 150 can be formed on the magnetic recording medium 155.

The magnetic recording medium 155 is loaded and used on a magnetic information reproducing device 200, such as a hard disk device. In the magnetic information reproducing device 200, a reproduction analog signal read by a magnetic head 210 is digitalized by a read channel 202. The resulting digital data corresponds to the modulated 10-bit data (1, 0, 0, 0, 1, 0, 1, 0, 0, 1). This 10-bit data is demodulated by a pattern demodulating device 204 so as to obtain the original data OR corresponding to the 6-bit data (1, 1, 1, 1, 1, 1).

As described above, since the present sixth embodiment uses the modulated magnetic pattern so modulated as to reduce the number of edges, the sixth embodiment can restrain transfer errors occurring upon transferring the magnetic pattern from the master to the magnetic recording medium.

In addition, although the magnetic recording medium 155 including the transferred pattern corresponding to the modulated magnetic pattern 151 is immediately loaded on the magnetic information reproducing device 200 in the above-described sixth embodiment, the magnetic recording medium 155 may be loaded on the magnetic information reproducing device 200 after an accurate transfer to the magnetic recording medium 155 is confirmed by a transfer evaluating device. In this case, the transfer evaluating device may comprise the same pattern demodulating device as described above.

The present invention is not limited to the specifically disclosed embodiments, and variations and modifications may be made without departing from the scope of the present invention.

The present application is based on Japanese priority applications No. 2001-270998 filed on Sep. 6, 2001 and No. 2001-359311 filed on Nov. 26, 2001, the entire contents of which are hereby incorporated by reference.

What is claimed is:

1. A method for transferring a magnetic pattern to a magnetic recording medium capable of recording magnetic information, the method comprising:

a master transferring step of applying a magnetic field to a master placed close to said magnetic recording medium, the magnetic field exciting a magnetic layer having a pattern patterned on said master according to said magnetic pattern, so as to transfer the pattern of said magnetic layer to said magnetic recording medium;

a pattern-difference measuring step of measuring a magnetic condition of said magnetic recording medium after said master transferring step so as to measure a magnetically different part between the pattern transferred to said magnetic recording medium and said magnetic pattern; and a magnetic transferring step of performing a pattern transfer to said magnetic recording medium by using said master while applying the magnetic field so as to correct a magnetic condition of said magnetically different part.

2. The method as claimed in claim 1, wherein said magnetic transferring step controls the magnetic field by changing a magnitude of an electric current supplied to an electromagnet in synchronization with positional information of said magnetically different part, the electromagnet generating the magnetic field applied for performing said pattern transfer.

3. The method as claimed in claim 1, wherein said magnetic transferring step controls the magnetic field by changing a distance between a permanent magnet and said master in synchronization with positional information of said magnetically different part, the permanent magnet generating the magnetic field applied for performing said pattern transfer.

4. The method as claimed in claim 2, wherein said magnetic transferring step performs said pattern transfer while monitoring the magnetic field applied from said electromagnet.

5. The method as claimed in claim 3, wherein said magnetic transferring step performs said pattern transfer while monitoring the magnetic field applied from said permanent magnet.

6. A magnetic-pattern transferring device transferring a magnetic pattern to a magnetic recording medium capable of recording magnetic information, the device comprising:

a master including a magnetic layer having a pattern patterned according to said magnetic pattern;

a magnet applying a magnetic field exciting said magnetic layer to said master placed close to said magnetic recording medium so as to transfer the pattern of said magnetic layer to said magnetic recording medium; and a controller controlling the magnetic field applied from said magnet so as to correct a magnetic condition of a magnetically different part between the pattern transferred to said magnetic recording medium and said magnetic pattern.

7. The magnetic-pattern transferring device as claimed in claim 6, further comprising a memory preliminarily storing difference data indicating said magnetically different part so that said controller controls the magnetic field applied from said magnet according to said difference data.

8. The magnetic-pattern transferring device as claimed in claim 7, further comprising a magnetic reproducing head measuring a magnetic condition of said magnetic recording medium so as to detect a magnetically different part detection signal indicating said magnetically different part, wherein said difference data is created according to said magnetically different part detection signal.

9. The magnetic-pattern transferring device as claimed in claim 6, wherein said magnet is an electromagnet generating the magnetic field applied to said master, the magnetic field being controlled by changing a magnitude of an electric current supplied to said electromagnet.

10. The magnetic-pattern transferring device as claimed in claim 6, wherein said magnet is a permanent magnet generating the magnetic field applied to said master, the magnetic field being controlled by changing a distance between said permanent magnet and said master.

11. The magnetic-pattern transferring device as claimed in claim 6, further comprising a magnetic sensor detecting the magnetic field applied from said magnet so as to supply a magnetic-field detection signal indicating a condition of the magnetic field to said controller, wherein said controller controls the magnetic field applied from said magnet by using said magnetic-field detection signal.

12. The magnetic-pattern transferring device as claimed in claim 6, further comprising a difference position detecting unit detecting a position of said magnetically different part on said magnetic recording medium so as to supply a position detection signal indicating the position of said magnetically different part to said controller, wherein said controller controls the magnetic field applied from said magnet positioned opposite said magnetically different part according to said position detection signal.

13. A method for manufacturing a magnetic recording medium, the method comprising the steps of:

preparing a modulated master including a modulated magnetic pattern so modulated from a predetermined magnetic pattern corresponding to magnetic information as to reduce the number of edges; and transferring said modulated magnetic pattern to said magnetic recording medium by using said modulated master so as to form a transferred pattern on said magnetic recording medium.

14. A magnetic information reproducing device loaded with a magnetic recording medium including magnetic information transferred thereto by using a modulated master including a modulated magnetic pattern so modulated from a predetermined magnetic pattern corresponding to the magnetic information as to reduce the number of edges; the device comprising:

a pattern demodulating device demodulating said modulated magnetic pattern so as to reproduce said magnetic information transferred to said magnetic recording medium.

* * * * *